US011935566B2

(12) United States Patent
Maruyama

(10) Patent No.: US 11,935,566 B2
(45) Date of Patent: Mar. 19, 2024

(54) MAGNETIC DISK DEVICE AND METHOD FOR SUPPRESSING TIME REQUIRED FOR REWRITE OPERATION CAUSED BY ADJACENT TRACK INTERFERENCE

(71) Applicants: Kabushiki Kaisha Toshiba, Tokyo (JP); Toshiba Electronic Devices & Storage Corporation, Tokyo (JP)

(72) Inventor: Syosuke Maruyama, Yamato Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/903,870

(22) Filed: Sep. 6, 2022

(65) Prior Publication Data
US 2023/0306991 A1 Sep. 28, 2023

(30) Foreign Application Priority Data

Mar. 23, 2022 (JP) ................................ 2022-046431

(51) Int. Cl.
*G11B 5/09* (2006.01)
*G11B 5/012* (2006.01)
*G11B 20/18* (2006.01)

(52) U.S. Cl.
CPC ............... *G11B 5/09* (2013.01); *G11B 5/012* (2013.01); *G11B 20/18* (2013.01); *G11B 2220/2516* (2013.01); *G11B 2220/63* (2013.01)

(58) Field of Classification Search
None
See application file for complete search history.

(56) References Cited

U.S. PATENT DOCUMENTS

| 6,891,694 | B2 | 5/2005 | Hetzler et al. |
| 7,080,200 | B2 | 7/2006 | Hassner |
| 7,626,908 | B2 | 12/2009 | Nakagawa et al. |
| 2019/0279678 | A1* | 9/2019 | Maruyama et al. ......................... G11B 20/1816 |
| 2022/0293129 | A1* | 9/2022 | Maeto .................... G11B 20/18 |

* cited by examiner

*Primary Examiner* — Craig A. Renner
(74) *Attorney, Agent, or Firm* — Allen & Overy LLP

(57) ABSTRACT

According to an embodiment, on a first track of a magnetic disk, a plurality of first sectors in each of which a data segment is stored, and a second sector in which a parity for first error correction is stored are arranged in this order from a first position. A controller executes a first operation of sequentially reading a first data segment from each of the plurality of first sectors, and storing a group of the read first data segments in a buffer memory. The controller obtains a first parity from the group of the read first data segments. The controller starts a second operation of writing each first data segment stored in the buffer memory, to a first sector that is a read source among the plurality of first sectors, and writing the first parity to the second sector, before the magnetic head reaches the first position.

20 Claims, 9 Drawing Sheets

MAGNETIC DISK DEVICE AND METHOD FOR SUPPRESSING TIME REQUIRED FOR REWRITE OPERATION CAUSED BY ADJACENT TRACK INTERFERENCE

CROSS-REFERENCE TO RELATED APPLICATIONS

This application is based upon and claims the benefit of priority from Japanese Patent Application No. 2022-046431, filed on Mar. 23, 2022; the entire contents of which are incorporated herein by reference.

FIELD

Embodiments described herein relate generally to a magnetic disk device and a method.

BACKGROUND

Adjacent track interference (ATI) is known as one of the effects on adjacent tracks when writing to a magnetic disk. According to the number of times of the writing to one track, the influence of the ATI received by the adjacent track accumulates, and eventually, the data of the adjacent track becomes difficult to read. Thus, the rewrite of all pieces of data is executed for the adjacent track before the data of the adjacent track becomes difficult to read.

DETAILED DESCRIPTION

According to an embodiment, a magnetic disk device includes a magnetic disk, a magnetic head, a buffer memory, and a controller. A first track is provided in the magnetic disk. On the first track, a plurality of first sectors in each of which a data segment is stored, and a second sector in which parity for first error correction is stored are arranged in this order from a first position in a write and read direction. The magnetic head executes writing and reading in the write and read direction for the first track. The controller executes a first operation of sequentially reading, from each of the plurality of first sectors, a first data segment stored therein as the data segment, and storing a group of the read first data segments in the buffer memory. The controller obtains a first parity from the group of the read first data segments. The controller executes a second operation of writing each first data segment in the group of the first data segments stored in the buffer memory, on a first sector that is a read source among the plurality of first sectors, and writing the first parity to the second sector. The start timing of the second operation is before the timing when the magnetic head reaches the first position.

The magnetic disk device and the method according to the embodiment will be described below in detail with reference to the accompanying drawings. In addition, the present invention is not limited by this embodiment.

Embodiment

Figure 1:
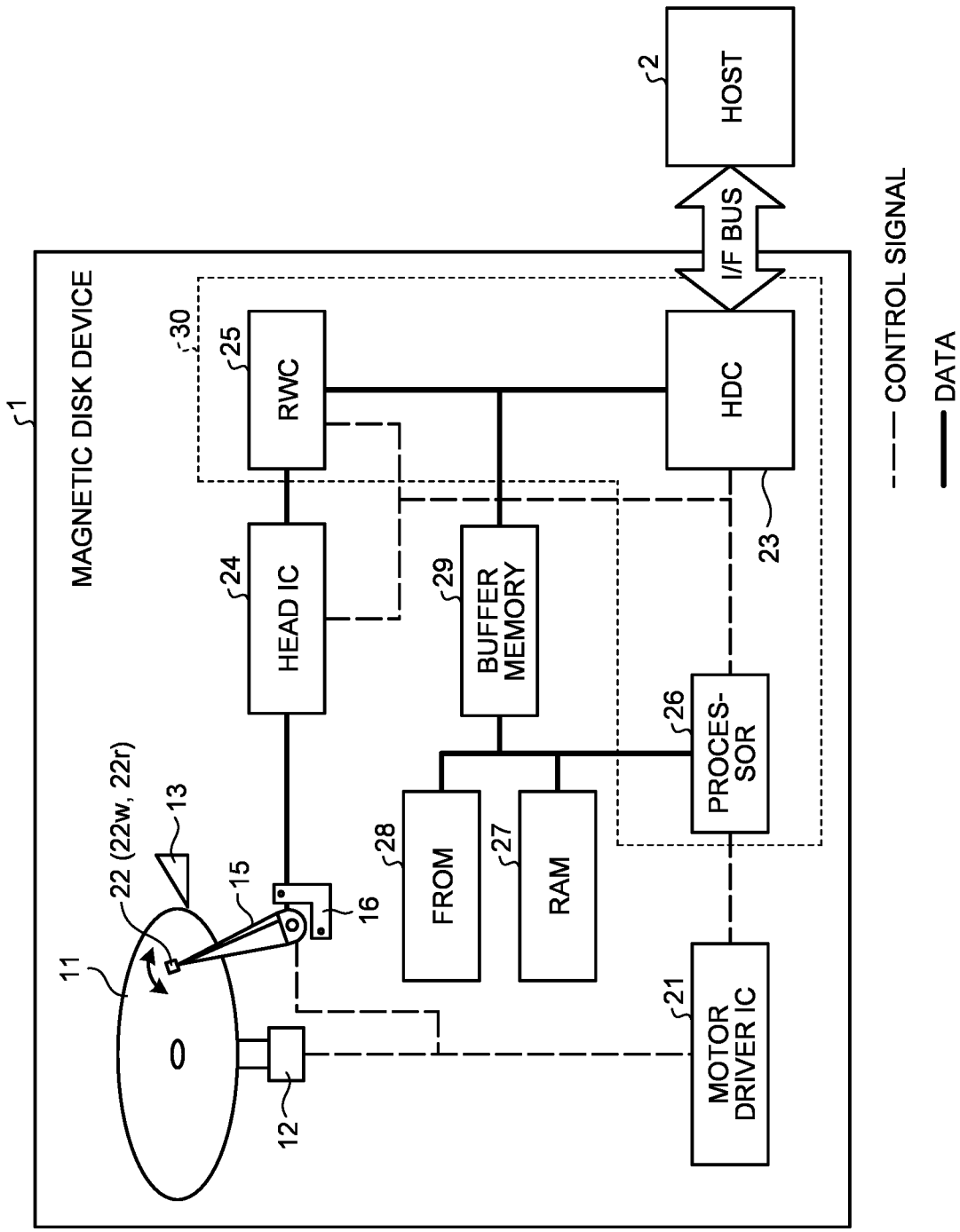
FIG. 1 is a schematic diagram illustrating an example of a configuration of a magnetic disk device of an embodiment.

FIG. 1 is a schematic diagram illustrating an example of a configuration of a magnetic disk device 1 of an embodiment.

The magnetic disk device 1 is connected to a host 2. The magnetic disk device 1 can receive access commands such as write commands and read commands from the host 2.

The magnetic disk device 1 includes a magnetic disk 11 with a magnetic layer formed on a surface of the magnetic disk 11. The magnetic disk device 1 writes data to the magnetic disk 11 or reads data from the magnetic disk 11 according to the access command.

Data is written or read via a magnetic head 22. In addition to the magnetic disk 11, the magnetic disk device 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a predetermined rotation speed by the spindle motor 12 mounted coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write core 22w and a read core 22r provided therein. The magnetic head 22 is attached to the tip of the actuator arm 15. The magnetic head 22 is moved in a radial direction of the magnetic disk 11 by the VCM 16. Note that a plurality of one or both of the write cores 22w and the read cores 22r provided in the magnetic head 22 may be provided for a single magnetic head 22.

In a case where the rotation of the magnetic disk 11 is stopped or the like, the magnetic head 22 is moved onto the ramp 13. The ramp 13 is configured to hold the magnetic head 22 at a position separated from the magnetic disk 11.

At the time of the read operation, the head IC 24 amplifies and outputs a signal read from the magnetic disk 11 by the magnetic head 22, and supplies the signal to the RWC 25. Further, at the time of the write operation, the head IC 24 amplifies a signal corresponding to data to be written supplied from the RWC 25, and supplies the signal to the magnetic head 22.

The HDC 23 performs control of transmission and reception of data with the host 2 via an I/F bus, control of the buffer memory 29, and the like.

The buffer memory 29 is used as a buffer for data transmitted to and received to and from the host 2. For example, the buffer memory 29 is used for temporarily storing data to be written or data read from the magnetic disk 11.

The buffer memory 29 is configured by a volatile memory capable of high-speed operation. The type of the memory configuring the buffer memory 29 is not limited to a specific type. The buffer memory 29 can be configured by, for example, a dynamic random access memory (DRAM), a static random access memory (SRAM), or a combination thereof. The buffer memory 29 may be configured by an arbitrary non-volatile memory.

The RWC 25 performs modulation such as error correction coding on the data to be written supplied from the HDC 23, and supplies the modulated data to the head IC 24. The RWC 25 performs demodulation including an error correction process for the signal, which is read from the magnetic disk 11 and is supplied from the head IC 24, and outputs the demodulated signal as digital data to the HDC 23.

The processor 26 is a central processing unit (CPU), for example. The RAM 27, the flash read only memory (FROM) 28, and the buffer memory 29 are connected to the processor 26.

The FROM 28 is a non-volatile memory. The FROM 28 stores firmware (program data) and various operating parameters. The firmware may be stored in the magnetic disk 11.

The RAM 27 is configured by, for example, a DRAM, an SRAM, or a combination thereof. The RAM 27 is used as an operation memory by the processor 26. The RAM 27 is used as an area in which the firmware is loaded and an area in which various types of management data are temporarily stored.

The processor 26 performs overall control of the magnetic disk device 1 according to firmware stored in the FROM 28 or the magnetic disk 11. For example, the processor 26 loads the firmware from the FROM 28 or the magnetic disk 11 to the RAM 27, and executes control of the motor driver IC 21, the head IC 24, the RWC 25, the HDC 23, and the like according to the loaded firmware.

The configuration including the HDC 23, the RWC 25, and the processor 26 can be regarded as a controller 30 that controls the operation of the magnetic disk device 1. In addition to those components, the controller 30 may include other components (for example, RAM 27, FROM 28, or buffer memory 29).

The firmware may be stored in the magnetic disk 11. Some or all of the functions of the processor 26 may be realized by a hardware circuit such as a field-programmable gate array (FPGA) or an application specific integrated circuit (ASIC).

The number of magnetic disks 11 included in the magnetic disk device 1 is not limited to one. Further, the magnetic disk device 1 may include actuator arms 15 and magnetic heads 22 in a number corresponding to the number of magnetic disks 11. In addition, in a case where the magnetic disk device 1 includes a plurality of magnetic heads 22, the plurality of magnetic heads 22 may be integrally moved, or the plurality of magnetic heads 22 may constitute a plurality of groups that can be independently moved.

Figure 2:
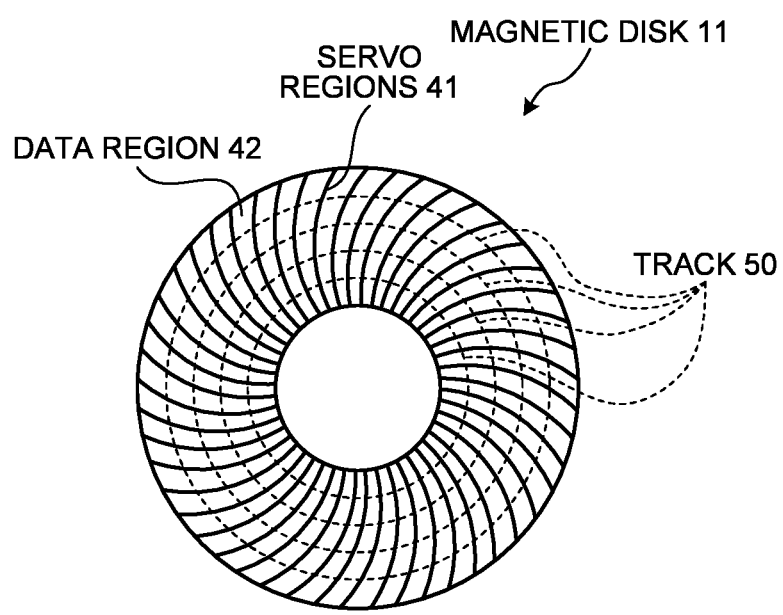
FIG. 2 is a diagram illustrating an example of a configuration of a magnetic disk of the embodiment.

FIG. 2 is a diagram illustrating an example of a configuration of the magnetic disk 11 of the embodiment. Servo data used for positioning the magnetic head 22 is written to the magnetic layer formed on the surface of the magnetic disk 11 by, for example, a servo writer or by self-servo writing (SSW).

FIG. 2 illustrates servo regions 41 radially arranged as an example of arrangement of the servo regions in which the servo data is written. In the circumferential direction, a portion between two servo regions 41 is a data region 42 in which data can be written. A plurality of concentric tracks 50 are provided in the radial direction of the magnetic disk 11. A plurality of sectors in which data of a predetermined size (sector size) is written are provided in the data region 42 on the track 50.

The servo data includes a servo mark, a gray code, a burst pattern, and a post code. The servo mark indicates the start of servo data. The gray code includes an ID for identifying each track 50 provided in the magnetic disk 11, that is, a track number, and an ID for identifying each servo sector (that is, the servo region 41) on the track 50, that is, a servo sector number. The burst pattern is data used to detect the amount of misalignment of the track indicated by the track number included in the gray code from the center. The track number included in the gray code is given as an integer value, for example, and it is possible to obtain an offset amount after the decimal point based on the position indicated by the track number by demodulating the burst pattern. That is, the current position of the magnetic head 22 in the radial direction is obtained by demodulating the burst pattern. The post code is data for correcting misalignment of the shape of the track 50 defined by the gray code and the burst pattern, from the ideal shape of the track 50.

In a case where data is written to the magnetic disk 11 or data is read from the magnetic disk 11, the controller 30 executes positioning of the magnetic head 22, that is, seek control and tracking control, on the basis of the servo data read from the servo region 41 by the magnetic head 22.

Figure 3:
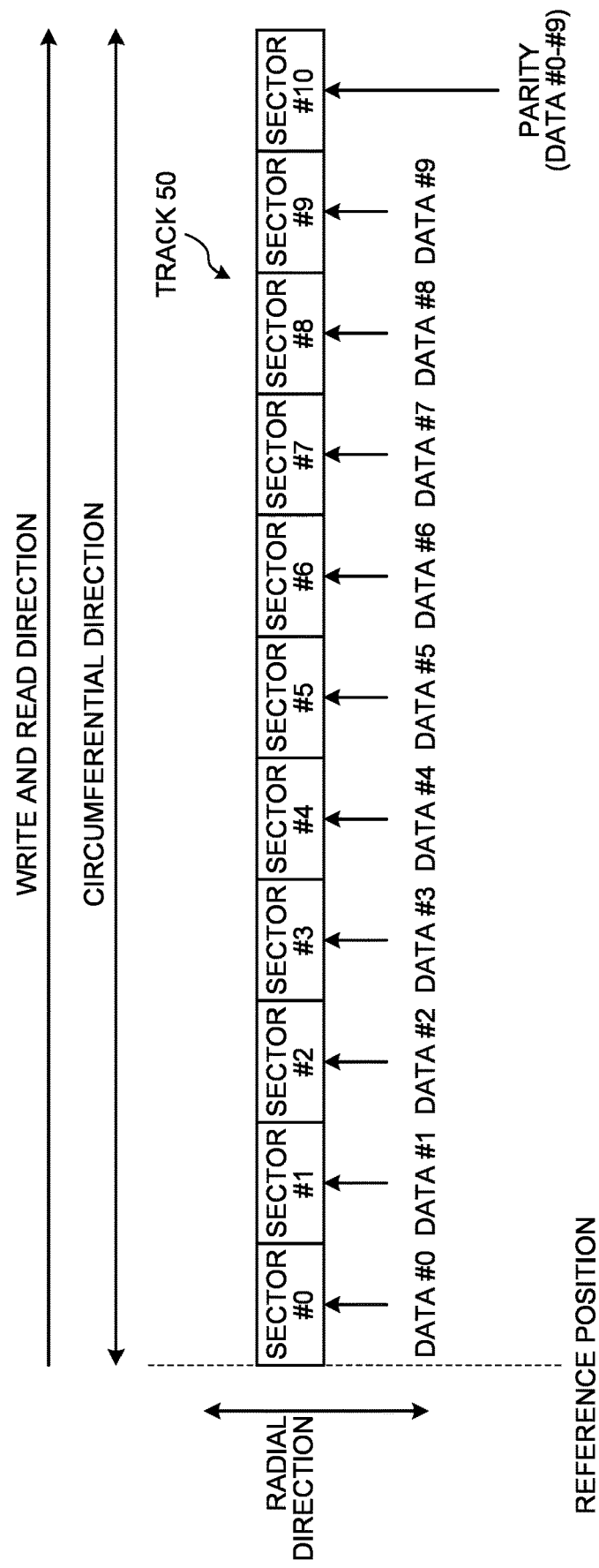
FIG. 3 is a schematic diagram illustrating an example of a configuration of one track of the embodiment.

FIG. 3 is a schematic diagram illustrating an example of a configuration of one track 50 of the embodiment. In FIG. 3, illustration of the servo region 41 is omitted. In FIG. 3, the write and read direction is illustrated. The write and read direction is a direction in which the magnetic head 22 is moved relative to the track 50 by the rotation of the magnetic disk 11. The magnetic head 22 writes data or reads data to or from each track 50 in the write and read direction.

Each sector provided in the track 50 is identified by a sector number. A sector with the sector number of x is described as a sector #x. In the example illustrated in FIG. 3, the track 50 has 11 sectors from sector #0 to sector #10.

The data written to each sector includes an error correction code. The RWC 25 can perform error correction on data read from one sector in units of sectors using the error correction code. The error correction in units of sectors is an example of second error correction.

The method of error correction coding for error correction in units of sectors is not limited to a specific method. In one example, a low-density parity-check code is applied as a method of error correction coding for error correction in units of sectors.

The 11 sectors are arranged in order of sector numbers in the write and read direction from the reference position. In other words, the reference position is a position where a sector having the smallest sector number is arranged in the track 50. The reference position is an example of the first position. In this specification, the head and the tail are defined on the basis of the reference position and the write and read direction.

For example, regarding a section from the passage of the magnetic head 22 through the reference position to the next passage of the reference position, that is, from the sector #0 to the sector #10, the sector through which the magnetic head 22 first passes, that is, the sector #0 is described to as a head sector. Regarding the sector #0 to the sector #10, the sector through which the magnetic head 22 passes last, that is, the sector #10 is described as a tail sector.

A position on a sector where the magnetic head 22 starts passing is described as a head of the sector. A position on a sector where the magnetic head 22 finishes passing is described as a tail of the sector.

The tail sector #10 is referred to as a sector for storing the parity. That is, the writing in units of the tracks 50 is executed, for example, as follows. First, data is written to the sector #0 to the sector #9 in order of the sector number. The parity generated on the basis of a group of pieces of data written to the sector #0 to the sector #9 is written to the tail sector #10 of the track 50.

The parity written to the sector #10 protects the group of pieces of data written to the sector #0 to the sector #9 from the occurrence of an error. That is, the parity written to the sector #10 protects the data in units of tracks. The error correction using the parity written to the sector #10 is described as error correction in units of tracks. The error correction in units of tracks is an example of first error correction.

A sector in which data is stored, such as the sector #0 to the sector #9, is described as a data sector. The data written to the data sector #x may be described as data #x. The data #x is an example of a data segment. A sector in which the parity is stored, such as the sector #10 is described as a parity sector.

The method of error correction coding for the error correction in units of tracks is not limited to a specific method. In one example, the parity is generated by executing XOR for each bit position on data #0 to data #9.

As described above, in a case where data is written to one track 50 (described as a first track 50), a track 50 (a second track 50) adjacent to the first track 50 is affected by ATI. The influence of the ATI received by the second track 50 is accumulated according to the number of times of the writing to the first track 50. In a case where the influence of the ATI received by the second track 50 becomes too large, it becomes difficult to read the data stored in the second track 50.

The controller 30 executes the rewrite of data before the data of each track 50 becomes difficult to read due to the influence of the ATI.

The controller 30 estimates the degree of the influence of the ATI received by each track 50 using, for example, ATI management information 271.

Figure 4:
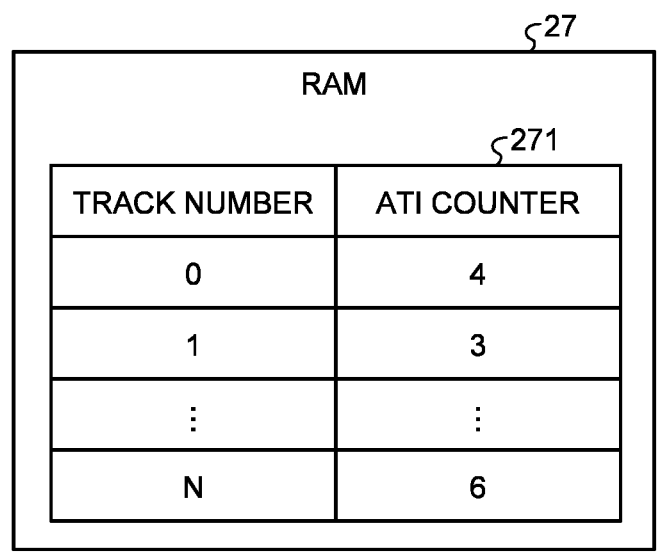
FIG. 4 is a schematic diagram illustrating an example of a data structure of ATI management information of the embodiment.

FIG. 4 is a schematic diagram illustrating an example of a data structure of the ATI management information 271 of the embodiment.

The ATI management information 271 has a data configuration of a table in which an ATI counter is recorded for each track 50. In a case where the writing of data to the track 50 is performed, the controller 30 increments the ATI counter for the track 50 near the write destination track 50. The value to be added in one increment is determined by a designer in an arbitrary method. In one example, the closer to the write destination track 50, the larger value is incremented. That is, the ATI counter indicates the degree of the influence of the ATI accumulated in the corresponding track 50.

The controller 30 compares the ATI counter of each track 50 with a threshold value. In a case where the ATI counter exceeding the threshold value is found, the controller 30 executes the rewrite on the track 50 corresponding to the ATI counter. After the rewrite, the controller 30 resets the ATI counter of the rewritten track 50.

As the threshold value to be compared with the ATI counter, a common value may be applied to all the tracks 50, or may be individually set for each track. The controller 30 may also change the threshold value during operation.

For example, in a case where writing in units of tracks is performed on a certain track 50 (described as a third track 50), all pieces of data of the third track 50 are in a state of being protected by parity. That is, the protection by the parity is valid.

Thereafter, in a case where the controller 30 performs overwriting on some data sectors of the third track 50, all pieces of data of the third track 50 are in a state of being not protected by the parity. That is, the protection by the parity is invalid.

The track 50 in which the protection by the parity is invalid is vulnerable to the influence of the ATI as compared with the track 50 in which the protection by the parity is valid. Thus, in a case where the protection by the parity is invalid, the controller 30 may use a smaller value than the value in a case where the protection by the parity is valid, as the threshold value.

Specifically, after writing in units of tracks is performed on the third track 50, the controller 30 uses a first threshold value for the comparison with the ATI counter corresponding to the third track 50. Then, in a case where overwriting is performed on some data sectors of the third track 50, the protection for the third track 50 by the parity becomes invalid. Then, the controller 30 uses a second threshold value smaller than the first threshold value for the comparison with the ATI counter corresponding to the third track 50. As a result, even in a case where the protection by the parity becomes invalid, the reading of the data stored in the third track 50 is prevented from becoming difficult due to the influence of the ATI.

Note that the method of changing the threshold value described above is an example. The threshold value may be changed in any method, or the threshold value may not be changed.

The controller 30 executes the rewrite in units of tracks on the track 50 with the ATI counter exceeding the threshold value. The rewrite in units of tracks is described as a rewrite operation.

Here, a technique to be compared with the embodiment will be described. According to the technique to be compared with the embodiment, at the time of a rewrite operation, a controller positions a read core of a magnetic head on a track as a rewrite target, and reads data and a parity in order from the reference position of the track as the rewrite target. In a case where the reading of the data and the parity from the track as the rewrite target is completed, the controller positions a write core of the magnetic head on the track as the rewrite target, and writes the data and the parity in order from the reference position of the track as the rewrite target.

According to the comparative example, in each of the reading in units of tracks and the writing in units of tracks, the access is started from the reference position of the track as the rewrite target. Since one rotation is required for each of the reading in units of tracks and the writing in units of tracks, and one rotation of the magnetic disk is further required between the reading in units of tracks and the writing in units of tracks, at least a time for three rotations of the magnetic disk is required for the rewrite operation.

In the embodiment, the controller 30 starts the writing in units of tracks without waiting for the magnetic head 22 (more precisely, the write core 22w) to reach the reference position. That is, the start timing of the writing in units of tracks is before the timing at which the magnetic head 22 reaches the reference position. As a result, the rewrite operation is completed in a shorter time than the time in the comparative example.

Hereinafter, the reading in units of tracks included in the rewrite operation is described as a track read operation. The writing in units of tracks included in the rewrite operation is described as a track write operation.

Figure 5:
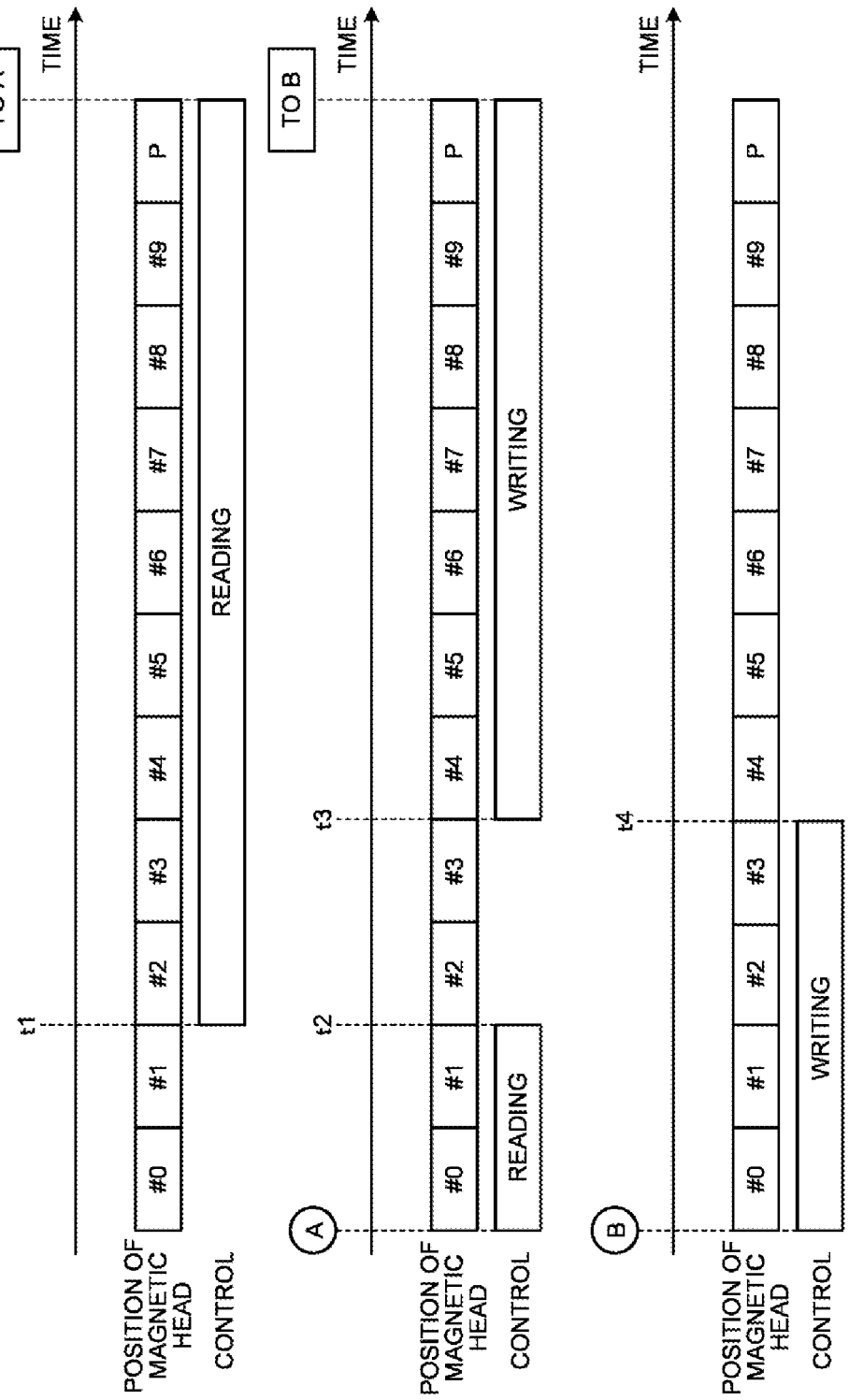
FIG. 5 is a diagram for describing an example of a rewrite operation of the embodiment.

FIG. 5 is a diagram for describing an example of a rewrite operation of the embodiment. FIG. 5 illustrates temporal transition of the position of the magnetic head 22 in the rewrite operation and the type of control by the controller 30 during the rewrite operation. In addition, "#x (where x is an integer from 0 to 9)" indicated as the position of the magnetic head 22 means a sector #x which is a data sector. Further, "P" indicated as the position of the magnetic head 22 means a parity sector, that is, the sector #10. In the following description of the drawing, the track 50 as the target of the rewrite operation is described as a target track 50.

In a case where the positioning of the read core 22r with respect to the target track 50 is completed and the preparation for the reading is completed, the controller 30 starts the track read operation from the sector that the magnetic head 22 first reaches, without waiting for the magnetic head 22 to reach the reference position. That is, the start timing of the track read operation is a timing before the magnetic head 22 reaches the reference position. In the example illustrated in FIG. 5, the track read operation is started at time t1 when the magnetic head 22 reaches the head of the sector #2.

The preparation for the reading includes various processes required for starting the reading, such as setting parameters relating to the current of the magnetic head 22.

The controller 30 executes reading on the sector #2, the sector #3, the sector #4, the sector #5, the sector #6, the sector #7, the sector #8, the sector #9, and the parity sector in this order, and the magnetic head 22 reaches the reference position, that is, the head position of the sector #0 (in other words, the tail of the parity sector). Then, the controller 30 continues the track read operation, and executes reading on the sector #0 and the sector #1 in this order.

At time t2, the magnetic disk 11 finishes one rotation with reference to time t1 at which the track read operation is started, and the reading of all the data and the parity stored in the target track 50 is completed. That is, the track read operation is ended.

In a case where the track read operation is completed, the controller 30 positions the write core 22w of the magnetic head 22 on the target track 50, and performs the preparation for the writing. The preparation for the writing includes various processes required for starting the writing, such as setting parameters relating to the current of the magnetic head 22.

While the positioning of the write core 22w and the preparation for the writing are performed, the rotation of the magnetic disk 11 continues. In a case where the positioning of the write core 22w and the preparation for the writing are ended, the controller 30 starts the track write operation from the sector that the magnetic head 22 first reaches, without waiting for the magnetic head 22 to reach the reference position. In the example illustrated in FIG. 5, the magnetic disk 11 is rotated by two sectors from time t2, and the track write operation is started at time t3 at which the magnetic head 22 reaches the head of the sector #4.

The controller 30 executes writing on the sector #4, the sector #5, the sector #6, the sector #7, the sector #8, the sector #9, and the parity sector in this order, and the magnetic head 22 reaches the reference position, that is, the head position of the sector #0 (in other words, the tail of the parity sector). Then, the controller 30 continues the track write operation, and executes writing on the sector #0, the sector #1, the sector #2, and the sector #3 in this order.

At time t4, the magnetic disk 11 finishes one rotation with reference to time t3 at which the track write operation is started, and the writing of all the data and the parity to the target track 50 is completed. That is, the track write operation is ended, and the rewrite operation is ended.

In the example illustrated in FIG. 5, the rewrite operation is started at time t1, and the rewrite operation is ended at time t4. While the magnetic disk 11 performs two rotations and the rotation for two sectors, the rewrite operation is ended. The time required for the rewrite operation is suppressed as compared with the comparative example in which the time for three rotations of the magnetic disk is required for the rewrite operation.

As described above, the track write operation is started as soon as the preparation is completed after the track read operation. Therefore, the time required for the rewrite operation is significantly suppressed.

Next, control of the controller 30 for realizing the operation illustrated in FIG. 5 will be described.

Figure 6:
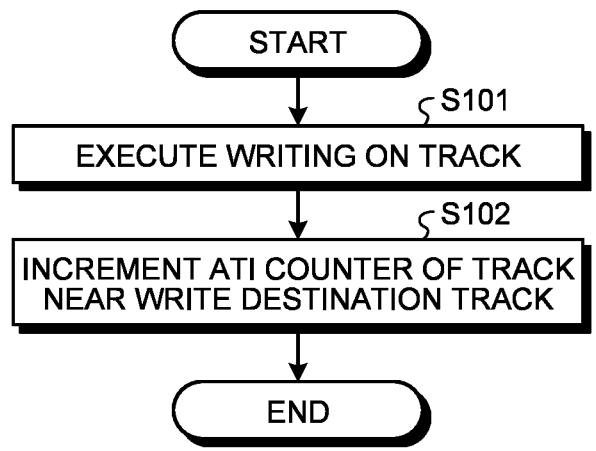
FIG. 6 is a flowchart illustrating an example of an operation of an ATI counter by a controller of the embodiment.

FIG. 6 is a flowchart illustrating an example of an operation of the ATI counter by the controller 30 of the embodiment.

In a case where the writing of data to a certain track 50 is performed (S101), the controller 30 increments the ATI counter for the track 50 near the write destination track 50 (S102). In S102, the controller 30 may increment the ATI counters of the tracks 50 on both sides of the write destination track 50 in the radial direction, or may increment the ATI counters of all the tracks 50 within a predetermined range in the radial direction around the write destination track 50. The amount added in one increment may be fixed, or may be different depending on the distance from the write destination track 50.

The operation of the ATI counter is ended in S102. The controller 30 executes a series of operations illustrated in FIG. 6 for every time data is written.

Figure 7:
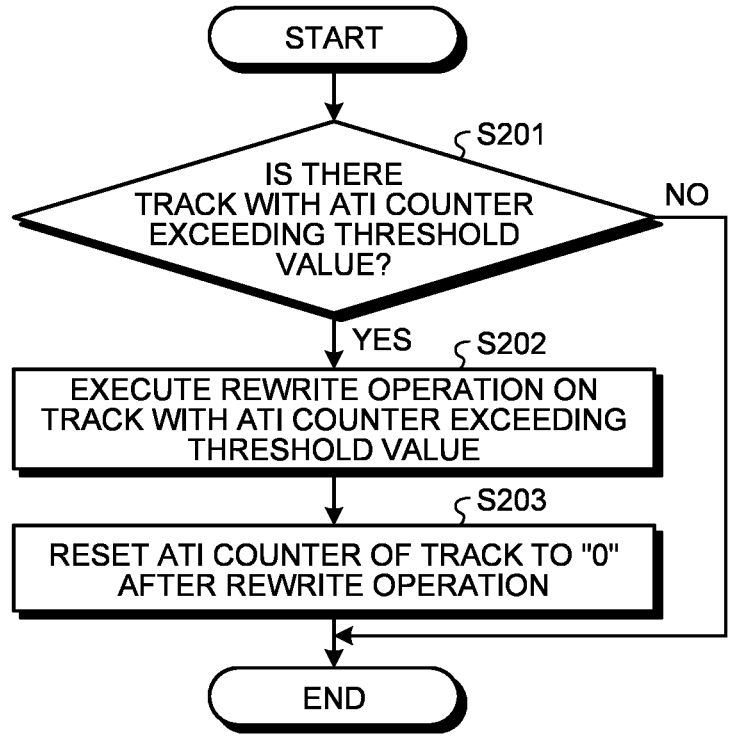
FIG. 7 is a flowchart illustrating an example of an operation of detecting a track as a rewrite target by the controller of the embodiment.

FIG. 7 is a flowchart illustrating an example of an operation of detecting the track 50 as the rewrite target by the controller 30 of the embodiment.

The controller 30 refers to the ATI management information 271, and determines whether there is a track 50 with the ATI counter exceeding the threshold value (S201). In a case where there is a track 50 with the ATI counter exceeding the threshold value (S201: Yes), the rewrite operation is executed on the track 50 (S202). After the rewrite operation, the controller 30 resets the ATI counter of the track 50 to "0" (S203). Then, the operation of detecting the track 50 as the rewrite target is ended.

In a case where there is no track 50 with the ATI counter exceeding the threshold value (S201: No), the operation of detecting the track 50 as the rewrite target is ended.

The controller 30 repeatedly executes a series of operations illustrated in FIG. 7. For example, the controller 30 executes the above operation in a case where the magnetic disk device 1 is not processing a command from the host 2 or the like. Alternatively, the controller 30 executes the above operation at a predetermined cycle. Alternatively, the controller 30 executes the above operation every time a predetermined amount of data is written to the magnetic disk 11.

Figure 8:
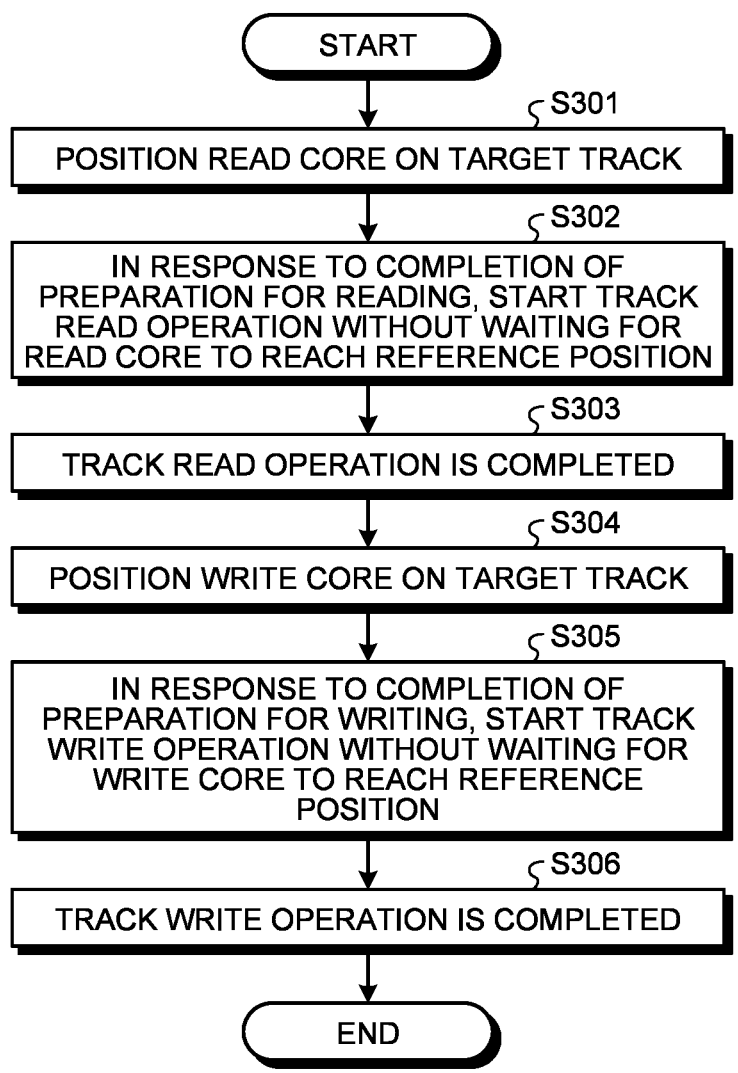
FIG. 8 is a flowchart illustrating an example of a rewrite operation of the embodiment.

FIG. 8 is a flowchart illustrating an example of the rewrite operation of the embodiment.

The controller 30 positions the read core 22r of the magnetic head 22 on the target track 50 (that is, the track 50 as the rewrite target) (S301). The target track 50 is an example of the first track.

In response to completion of the positioning of the read core 22r and completion of the preparation for the reading, the controller 30 starts the track read operation without waiting for the read core 22r to reach the reference position (S302). The track read operation is an example of the first operation.

In a case where the track read operation is completed (S303), the controller 30 positions the write core 22w of the magnetic head 22 on the target track 50 (S304).

In a case where the positioning of the write core 22w is completed and the preparation for the writing is completed, the controller 30 starts the track write operation without waiting for the write core 22w to reach the reference position (S305). The track write operation is an example of the second operation.

In a case where the track write operation is completed (S306), the rewrite operation is ended.

Figure 9:
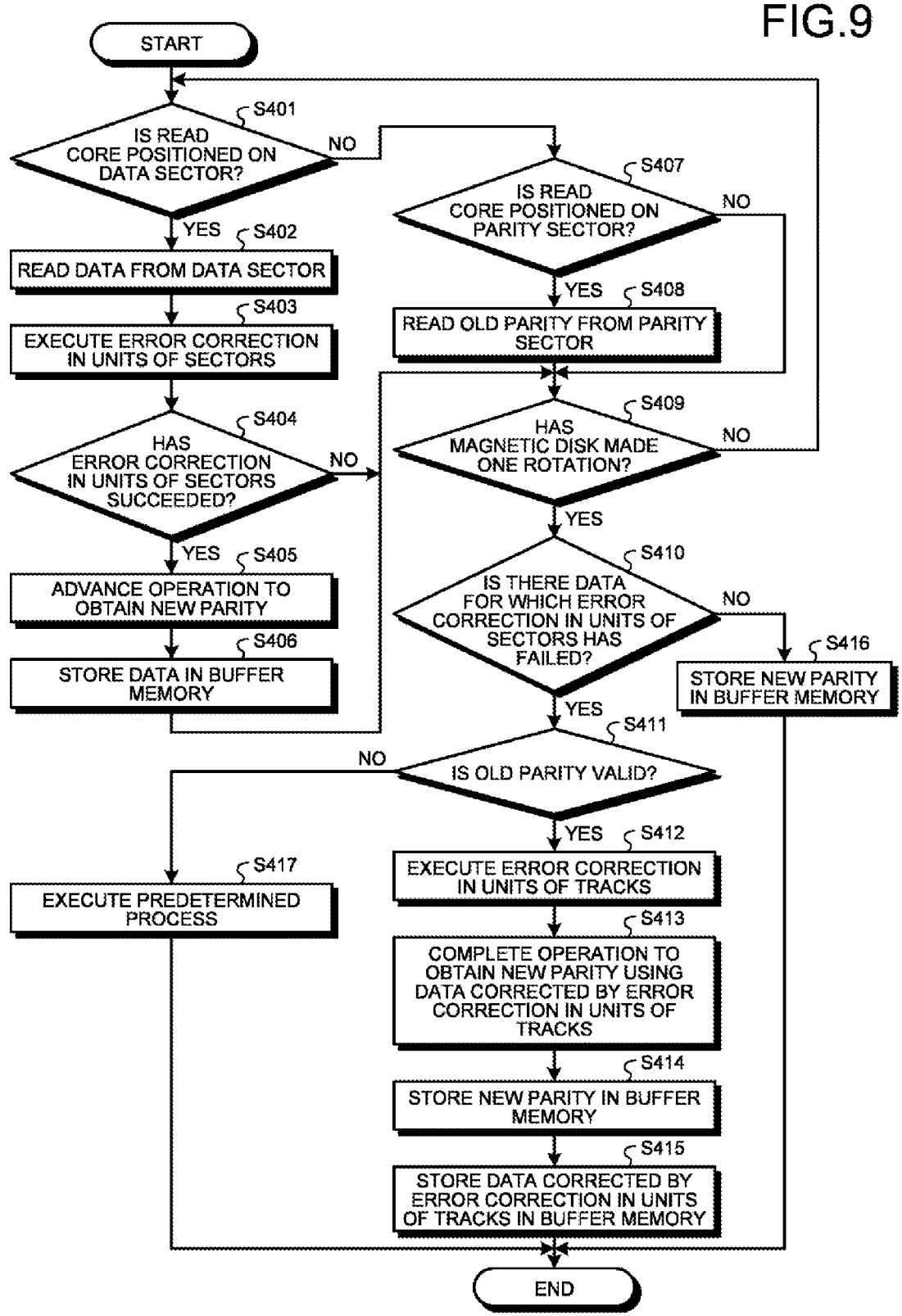
FIG. 9 is a flowchart illustrating an example of a track read operation of the embodiment.

FIG. 9 is a flowchart illustrating an example of the track read operation of the embodiment.

In the track read operation, a loop process from S401 to S409 is repeatedly executed until the magnetic disk 11 makes one rotation.

In the loop process, the controller 30 determines whether the read core 22r is positioned on a data sector (S401). In a case where the read core 22r is positioned on a data sector (S401: Yes), the controller 30 reads the data from the data sector by the read core 22r (S402), and executes error correction in units of sectors on the read data by the RWC 25 (S403).

In a case where the error correction in units of sectors has succeeded (S404: Yes), the controller 30 advances an operation to obtain a new parity using the read data (S405). The new parity is an example of the first parity.

In the track read operation, the controller 30 obtains the parity using the data read from all the data sectors. In one example, the parity is obtained by XOR of the data read from all the data sectors. The controller 30 advances the XOR operation every time the data is normally read from the data sector (that is, every time the error correction of the read data in units of sectors succeeds).

Subsequent to S405, the controller 30 stores the read data in the buffer memory 29 (S406). Then, the control proceeds to S409 described later.

In a case where the error correction in units of sectors has failed (S404: No), that is, in a case where the data cannot be normally read from the data sector, the controller 30 skips the processes of S405 and S406, and the control proceeds to S409. The data desired to be normally read from the data sector (that is, data for which error correction in units of sectors has failed) is not used for the XOR operation until being corrected by error correction in units of tracks described later.

In a case where the read core 22r is not positioned on the data sector (S401: No), the controller 30 determines whether the read core 22r is positioned on the parity sector (S407). In a case where the read core 22r is not positioned on the parity sector (S407: No), the control proceeds to S409.

In a case where the read core 22r is positioned on the parity sector (S407: Yes), the controller 30 reads the parity from the parity sector (S408). Then, the control proceeds to S409.

The error correction in units of tracks can be executed only in a case where the parity read in S408 has the same value as the parity newly calculated in S405 and S415 described later. Therefore, the parity read in S408 may not have the same value as the parity newly calculated in S405 and S415 described later. The parity read in S408 is described as an old parity. The old parity is an example of a second parity.

In S409, the controller 30 determines whether the magnetic disk 11 has made one rotation after the track read operation is started. In a case where the magnetic disk 11 has not yet made one rotation (S409: No), the control proceeds to S401.

In a case where the magnetic disk 11 has made one rotation (S409: Yes), the controller 30 determines whether there is data for which error correction in units of sectors has failed (S410). That is, the controller 30 determines whether error correction in units of sectors has failed at the time of the reading from any data sector.

In a case where there is data for which the error correction in units of sectors has failed (S410: Yes), the controller 30 determines whether the old parity is valid (S411). In a case where the old parity is valid (S411: Yes), the controller 30 executes the error correction in units of tracks in order to perform the error correction on the data for which the error correction in units of sectors has failed (S412).

Subsequently, the controller 30 completes the operation to obtaining a new parity using the data corrected by the error correction in units of tracks (S413). As a result, a new parity based on the data read from all the data sectors is obtained.

The controller 30 stores the new parity in the buffer memory 29 (S414).

Then, the controller 30 stores the data corrected by the error correction in units of tracks in the buffer memory 29 (S415), and the track write operation is ended.

In a case where the old parity is not valid (S411: No), the controller 30 cannot acquire correct data even in a case where the error correction in units of tracks is executed. Therefore, the controller 30 executes a predetermined process (S417), and the track write operation is ended.

The predetermined process is arbitrarily designed by a designer. For example, the controller 30 may execute the reading again on the data sector from which the data cannot be normally read. Alternatively, the controller 30 may execute the track read operation again.

In a case where there is no data for which the error correction in units of sectors has failed (S410: No), a new parity is obtained by the process of S405 executed last. The controller 30 stores the new parity in the buffer memory 29 (S416), and the track write operation is ended.

By a series of processes illustrated in FIG. 9, data is sequentially read from each data sector, and a group of pieces of read data is stored in the buffer memory 29. This series of processes is completed in a period in which the magnetic disk 11 makes one rotation.

Figure 10:
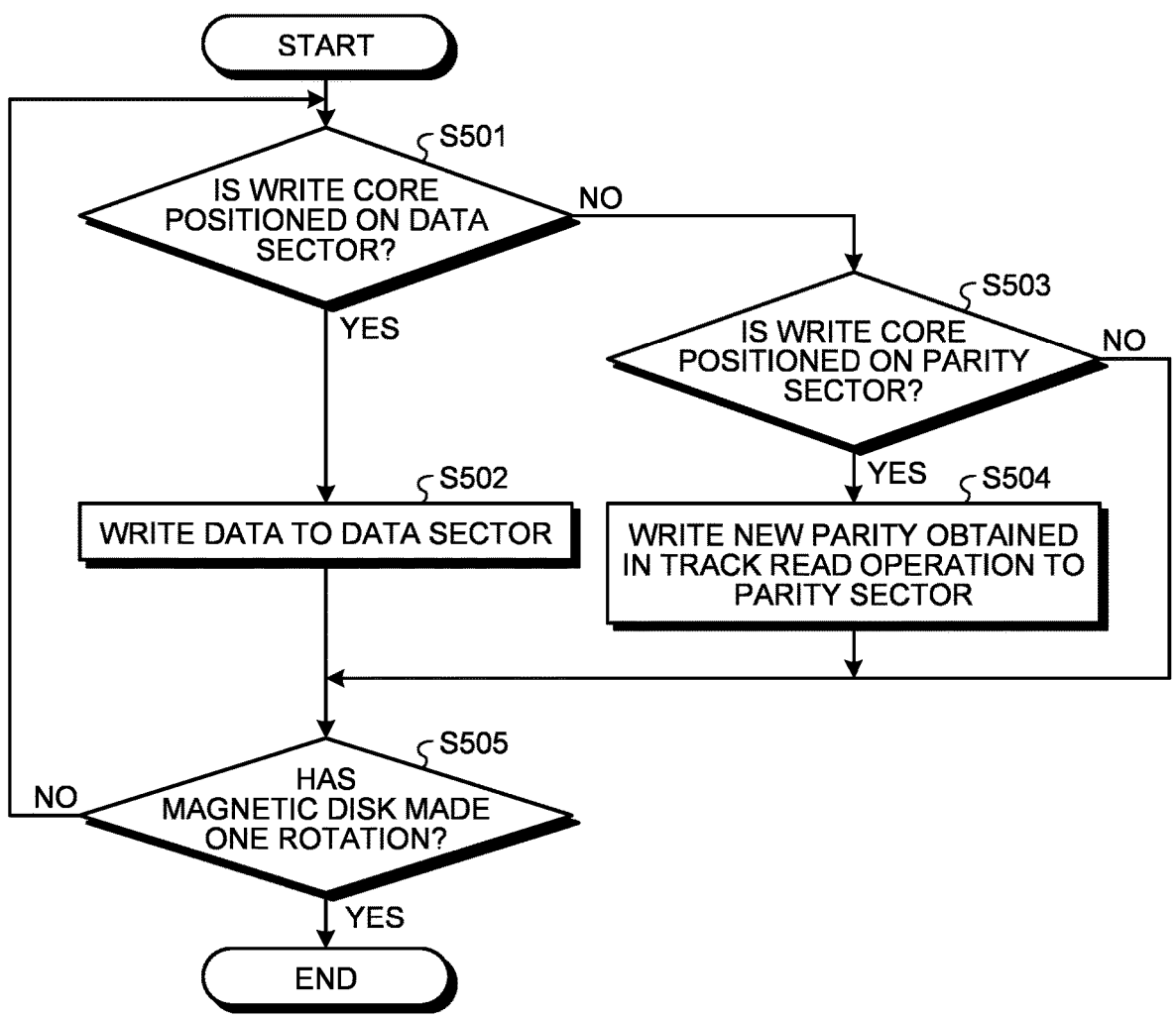
FIG. 10 is a flowchart illustrating an example of a track write operation of the embodiment.

FIG. 10 is a flowchart illustrating an example of the track write operation of the embodiment.

In the track write operation, a loop process from S501 to S505 is repeatedly executed until the magnetic disk 11 makes one rotation.

In the loop process, the controller 30 determines whether the write core 22w is positioned on a data sector (S501). In a case where the write core 22w is positioned on a data sector (S501: Yes), the controller 30 writes the data, which is read from the data sector and is stored in the buffer memory 29, to the data sector (S502). Then, the control proceeds to S505.

In a case where the write core 22w is not positioned on a data sector (S501: No), the controller 30 determines whether the write core 22w is positioned on the parity sector (S503).

In a case where the write core 22*w* is not positioned on the parity sector (S503: No), the control proceeds to S505.

In a case where the write core 22*w* is positioned on the parity sector (S503: Yes), the controller 30 writes the new parity, which is obtained by the track read operation and is stored in the buffer memory 29, to the parity sector (S504). Then, the control proceeds to S505.

In a case where the write core 22*w* is not positioned on the parity sector (S503: No), the control proceeds to S505.

In S505, the controller 30 determines whether the magnetic disk 11 has made one rotation after the track write operation is started. In a case where the magnetic disk 11 has not yet made one rotation (S505: No), the control proceeds to S501.

In a case where the magnetic disk 11 has made one rotation (S505: Yes), the track write operation is ended.

By the series of processes illustrated in FIG. 10, each piece of data in the group of pieces of data stored in the buffer memory 29 is written to the data sector that is the read source, and the new parity is written to the parity sector. This series of processes is completed in a period in which the magnetic disk 11 makes one rotation.

In the example described above, the controller 30 starts the track read operation without waiting for the magnetic head 22 to reach the reference position. The track read operation may be started at a timing when the magnetic head 22 reaches the reference position. Even in a case where the controller 30 is configured to start the track read operation at the timing when the magnetic head 22 reaches the reference position, the subsequent track write operation can be started as soon as the preparation for positioning the write core 22*w* is completed. Therefore, the time required for the rewrite operation can be suppressed.

In addition, in the track read operation illustrated in FIG. 9, the new parity is stored in the buffer memory 29 in S414 or S416. Then, in the track write operation illustrated in FIG. 10, the new parity stored in the buffer memory 29 is written to the parity sector. The new parity may not be necessarily stored in the buffer memory 29. For example, the new parity may be calculated in the RWC 25 and held in the RWC 25 in the track read operation, and the new parity held in the RWC 25 may be written to the parity sector in the subsequent track write operation.

As described above, according to the embodiment, in the rewrite operation, the controller 30 executes the track read operation, the acquisition of a new parity, and the track write operation after the track read operation. In the track read operation, the controller 30 sequentially reads data from each data sector, and stores a group of pieces of the read data in the buffer memory 29. The controller 30 obtains a new parity from the group of pieces of the read data. In the track write operation, the controller 30 writes each piece of data in the group of pieces of data stored in the buffer memory 29, to the data sector that is the read source, and writes the new parity to the parity sector. The controller 30 starts the track write operation without waiting for the magnetic head 22 to reach the reference position.

Therefore, the time required for the rewrite operation is suppressed.

Further, according to the embodiment, the controller 30 advances the operation to obtain a new parity every time the data is read from the data sector in the track read operation.

Therefore, the controller 30 can obtain a new parity at the time when the track read operation is ended.

The controller 30 may calculate a new parity after acquiring the data corresponding to all the data tracks from the target track 50, and then start the track write operation.

Further, according to the embodiment, in the track read operation, the controller 30 reads the old parity when the magnetic head 22 passes through the parity sector. The controller 30 executes error correction in units of sectors on the data every time the data is read from one data sector, and stores the data in the buffer memory 29 in a case where the error correction in units of sectors succeeds. The controller 30 executes the error correction in units of tracks using the old parity in a case where the error correction in units of sectors fails, and stores the data corrected through the error correction in units of tracks, in the buffer memory.

Therefore, even in a case where the error correction in units of sectors fails, the data can be normally read as long as the old parity is valid.

In addition, according to the embodiment, the controller 30 completes the track read operation while the magnetic disk 11 makes one rotation after starting the track read operation. After the track read operation is completed, the controller 30 starts the track write operation without waiting for the magnetic head 22 to reach the reference position. The controller 30 completes the track write operation while the magnetic disk 11 makes one rotation after starting the track write operation.

Therefore, the controller 30 can complete the rewrite operation in a time shorter than a time in which the magnetic disk 11 makes three rotations.

Further, according to the embodiment, the controller 30 estimates the degree of the influence of ATI, and executes the rewrite operation on the track 50 with the degree of the influence of the ATI exceeding the threshold value.

The trigger for starting the rewrite operation may not be necessarily based on the degree of the influence of the ATI. The designer can arbitrarily set conditions under which the controller 30 executes the rewrite operation.

What is claimed is:

1. A magnetic disk device comprising:
   a magnetic disk provided with a first track in which a plurality of first sectors in each of which a data segment is stored, and a second sector in which a parity for first error correction is stored are arranged in this order in a write and read direction from a first position;
   a magnetic head that executes writing and reading on the first track in the write and read direction;
   a buffer memory; and
   a controller that
      executes a first operation of sequentially reading, from each of the plurality of first sectors, a first data segment stored therein as the data segment, and storing a group of the read first data segments in the buffer memory,
      obtains a first parity from the group of the read first data segments, and
      executes a second operation of writing each first data segment in the group of the first data segments stored in the buffer memory, to a first sector that is a read source among the plurality of first sectors, and writing the first parity to the second sector, a start timing of the second operation being before a timing when the magnetic head reaches the first position.

2. The magnetic disk device according to claim 1, wherein a start timing of the first operation is before the timing when the magnetic head reaches the first position.

3. The magnetic disk device according to claim 1, wherein in the first operation, the controller advances an operation to obtain the first parity every time one first data segment is read.

4. The magnetic disk device according to claim 2, wherein in the first operation, the controller advances an operation to obtain the first parity every time one first data segment is read.

5. The magnetic disk device according to claim 1, wherein in the first operation, the controller
reads a second parity that is the parity stored in the second sector when the magnetic head passes through the second sector,
every time one first data segment is read, executes second error correction on the first data segment,
stores the first data segment in the buffer memory in a case where the second error correction succeeds, and
executes the first error correction using the second parity on the first data segment and stores the first data segment subjected to the first error correction in the buffer memory in a case where the second error correction fails.

6. The magnetic disk device according to claim 2, wherein in the first operation, the controller
reads a second parity that is the parity stored in the second sector when the magnetic head passes through the second sector,
every time one first data segment is read, executes second error correction on the first data segment,
stores the first data segment in the buffer memory in a case where the second error correction succeeds, and
executes the first error correction using the second parity on the first data segment and stores the first data segment subjected to the first error correction in the buffer memory in a case where the second error correction fails.

7. The magnetic disk device according to claim 3, wherein in the first operation, the controller
reads a second parity that is the parity stored in the second sector when the magnetic head passes through the second sector,
every time one first data segment is read, executes second error correction on the first data segment,
stores the first data segment in the buffer memory in a case where the second error correction succeeds, and
executes the first error correction using the second parity on the first data segment and stores the first data segment subjected to the first error correction in the buffer memory in a case where the second error correction fails.

8. The magnetic disk device according to claim 1, wherein the controller completes the second operation while the magnetic disk makes one rotation after starting the second operation.

9. The magnetic disk device according to claim 1, wherein the controller completes the first operation while the magnetic disk makes one rotation after starting the first operation.

10. The magnetic disk device according to claim 1, wherein
a plurality of second tracks including the first track are provided in the magnetic disk, and
the controller estimates a degree of influence of adjacent track interference (ATI) accumulated in each second track, and executes the first operation and the second operation in a case where a degree of influence of the ATI accumulated in the first track exceeds a threshold value.

11. A method of controlling a magnetic disk and a magnetic head, the magnetic disk being provided with a first track in which a plurality of first sectors in each of which a data segment is stored, and a second sector in which a parity for first error correction is stored are arranged in this order in a write and read direction from a first position, the magnetic head executing writing and reading on the first track in the write and read direction, the method comprising:
executing a first operation of sequentially reading, from each of the plurality of first sectors, a first data segment stored therein as the data segment, and storing a group of the read first data segments in a buffer memory;
obtaining a first parity from the group of the read first data segments; and
executing a second operation of writing each first data segment in the group of the first data segments stored in the buffer memory, to a first sector that is a read source among the plurality of first sectors, and writing the first parity to the second sector, wherein
a start timing of the second operation is before a timing when the magnetic head reaches the first position.

12. The method according to claim 11, wherein
a start timing of the first operation is before the timing when the magnetic head reaches the first position.

13. The method according to claim 11, wherein
executing the first operation includes advancing an operation to obtain the first parity every time one first data segment is read.

14. The method according to claim 12, wherein
executing the first operation includes advancing an operation to obtain the first parity every time one first data segment is read.

15. The method according to claim 11, wherein
executing the first operation includes
reading a second parity that is the parity stored in the second sector when the magnetic head passes through the second sector,
every time one first data segment is read, executing second error correction on the first data segment,
storing the first data segment in the buffer memory in a case where the second error correction succeeds, and
executing the first error correction using the second parity on the first data segment and storing the first data segment subjected to the first error correction in the buffer memory in a case where the second error correction fails.

16. The method according to claim 12, wherein
executing the first operation includes
reading a second parity that is the parity stored in the second sector when the magnetic head passes through the second sector,
every time one first data segment is read, executing second error correction on the first data segment,
storing the first data segment in the buffer memory in a case where the second error correction succeeds, and
executing the first error correction using the second parity on the first data segment and storing the first data segment subjected to the first error correction in the buffer memory in a case where the second error correction fails.

17. The method according to claim 13, wherein
executing the first operation includes
reading a second parity that is the parity stored in the second sector when the magnetic head passes through the second sector,
every time one first data segment is read, executing second error correction on the first data segment, storing the first data segment in the buffer memory in a case where the second error correction succeeds, and executing the first error correction using the second parity on the first data segment and storing the first data segment subjected to the first error correction in the buffer memory in a case where the second error correction fails.

18. The method according to claim 11, wherein executing the second operation includes completing the second operation while the magnetic disk makes one rotation after starting the second operation.

19. The method according to claim 11, wherein executing the first operation includes completing the first operation while the magnetic disk makes one rotation after starting the first operation.

20. The method according to claim 11, wherein a plurality of second tracks including the first track are provided in the magnetic disk, and the method further includes estimating a degree of influence of ATI accumulated in each second track, and executing the first operation and the second operation in a case where a degree of influence of the ATI accumulated in the first track exceeds a threshold value.

* * * * *